(12) United States Patent
Pfadler et al.

(10) Patent No.: US 11,147,035 B2
(45) Date of Patent: Oct. 12, 2021

(54) METHODS, COMPUTER PROGRAMS, AND APPARATUSES FOR A COMMAND CENTER AND A VEHICLE, A VEHICLE AND A COMMAND CENTER

(71) Applicant: VOLKSWAGEN AKTIENGESELLSCHAFT, Wolfsburg (DE)

(72) Inventors: Andreas Pfadler, Berlin (DE); Guillaume Jornod, Berlin (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/943,565

(22) Filed: Jul. 30, 2020

(65) Prior Publication Data
US 2021/0037495 A1 Feb. 4, 2021

(30) Foreign Application Priority Data

Jul. 30, 2019 (EP) .................................. 19189108

(51) Int. Cl.
*H04J 3/06* (2006.01)
*H04W 56/00* (2009.01)
*G05D 1/00* (2006.01)

(52) U.S. Cl.
CPC ...... *H04W 56/0045* (2013.01); *G05D 1/0011* (2013.01); *H04W 56/0065* (2013.01)

(58) Field of Classification Search
CPC ......... H04W 56/0045; H04W 56/0065; H04W 4/44; H04W 4/40; H04W 92/18; G05D 1/0011; G05D 1/0297; G05D 2201/0213; G05D 1/0285; H04L 67/12; H04L 67/125; B60W 40/02; B60W 60/001;
(Continued)

(56) References Cited

U.S. PATENT DOCUMENTS

| 8,368,559 B2 * | 2/2013 | Pixley .................. G08G 1/0104 340/933 |
| 9,094,929 B2 * | 7/2015 | Fix ......................... G01S 5/0284 |

(Continued)

FOREIGN PATENT DOCUMENTS

| CN | 107135163 A | * | 9/2017 | |
| DE | 102005041912 A1 | * | 3/2006 | .............. H04J 3/062 |

(Continued)

OTHER PUBLICATIONS

Search Report for European Patent Application No. 19189108.4; dated Dec. 5, 2019.

*Primary Examiner* — Mahendra R Patel
(74) *Attorney, Agent, or Firm* — Barnes & Thornburg LLP

(57) ABSTRACT

Methods, computer programs, and apparatuses for a command center and a transportation vehicle, a transportation vehicle and command center. The method for a command center to teleoperate a transportation vehicle includes receiving input data from the transportation vehicle, estimating a current uplink delay based on the input data from the transportation vehicle, determining an estimated downlink and uplink delay based on the input data and the estimated current uplink delay, and determining control information for the transportation vehicle which at least partly compensates the estimated downlink and uplink delay. The method also includes transmitting information related to the control information to the transportation vehicle.

19 Claims, 6 Drawing Sheets

(58) Field of Classification Search
CPC ........ B60W 2050/0064; G08G 1/0104; G08G 1/056; B60P 1/5457
USPC ........................................................ 370/350
See application file for complete search history.

(56) References Cited

U.S. PATENT DOCUMENTS

| | | | | |
|---|---|---|---|---|
| 9,215,555 | B2* | 12/2015 | Lee | H04W 4/02 |
| 2008/0120129 | A1* | 5/2008 | Seubert | G06Q 10/10 |
| | | | | 705/35 |
| 2010/0269143 | A1* | 10/2010 | Rabowsky | H04N 7/20 |
| | | | | 725/63 |
| 2011/0050461 | A1* | 3/2011 | Pixley | G08G 1/056 |
| | | | | 340/933 |
| 2011/0090399 | A1* | 4/2011 | Whitaker | H04N 21/4307 |
| | | | | 348/500 |
| 2011/0156924 | A1* | 6/2011 | Nadeem | G08G 1/0104 |
| | | | | 340/905 |
| 2015/0222378 | A1* | 8/2015 | Stahlin | G08G 1/0112 |
| | | | | 370/324 |
| 2016/0339926 | A1* | 11/2016 | Ballmann | B60W 50/0205 |
| 2017/0186317 | A1* | 6/2017 | Franklin | G08G 1/149 |
| 2017/0230803 | A1* | 8/2017 | Calabuig Gaspar | H04W 4/12 |
| 2017/0280416 | A1* | 9/2017 | Zalewski | H04L 43/106 |
| 2018/0239968 | A1* | 8/2018 | Gupta | G06K 9/00798 |
| 2019/0086219 | A1* | 3/2019 | Hashisho | G01C 21/20 |
| 2019/0168769 | A1* | 6/2019 | Zhu | B60W 30/10 |
| 2019/0219404 | A1* | 7/2019 | Ahn | G01C 21/30 |
| 2019/0294176 | A1* | 9/2019 | Ozbilgin | G01S 17/87 |
| 2019/0394624 | A1* | 12/2019 | Karampatsis | H04W 48/18 |
| 2020/0242922 | A1* | 7/2020 | Dulberg | G08G 1/164 |

FOREIGN PATENT DOCUMENTS

| | | |
|---|---|---|
| EP | 2865495 A1 | 4/2015 |
| EP | 2865496 A1 | 4/2015 |
| EP | 3339999 A2 | 6/2018 |

* cited by examiner

US 11,147,035 B2

METHODS, COMPUTER PROGRAMS, AND APPARATUSES FOR A COMMAND CENTER AND A VEHICLE, A VEHICLE AND A COMMAND CENTER

PRIORITY CLAIM

This patent application claims priority to European Patent Application No. 19189108.4, filed 30 Jul. 2019, the disclosure of which is incorporated herein by reference in its entirety.

SUMMARY

Illustrative embodiments relate to methods, computer programs, and apparatuses for a command center and for a transportation vehicle, a transportation vehicle and command center, more specifically, but not exclusively, to a concept for delay compensation in teleoperated driving (ToD).

BRIEF DESCRIPTION OF THE DRAWINGS

Disclosed embodiments will be described by way of example only, and with reference to the accompanying figures, in which.

DETAILED DESCRIPTION

Figure 1:
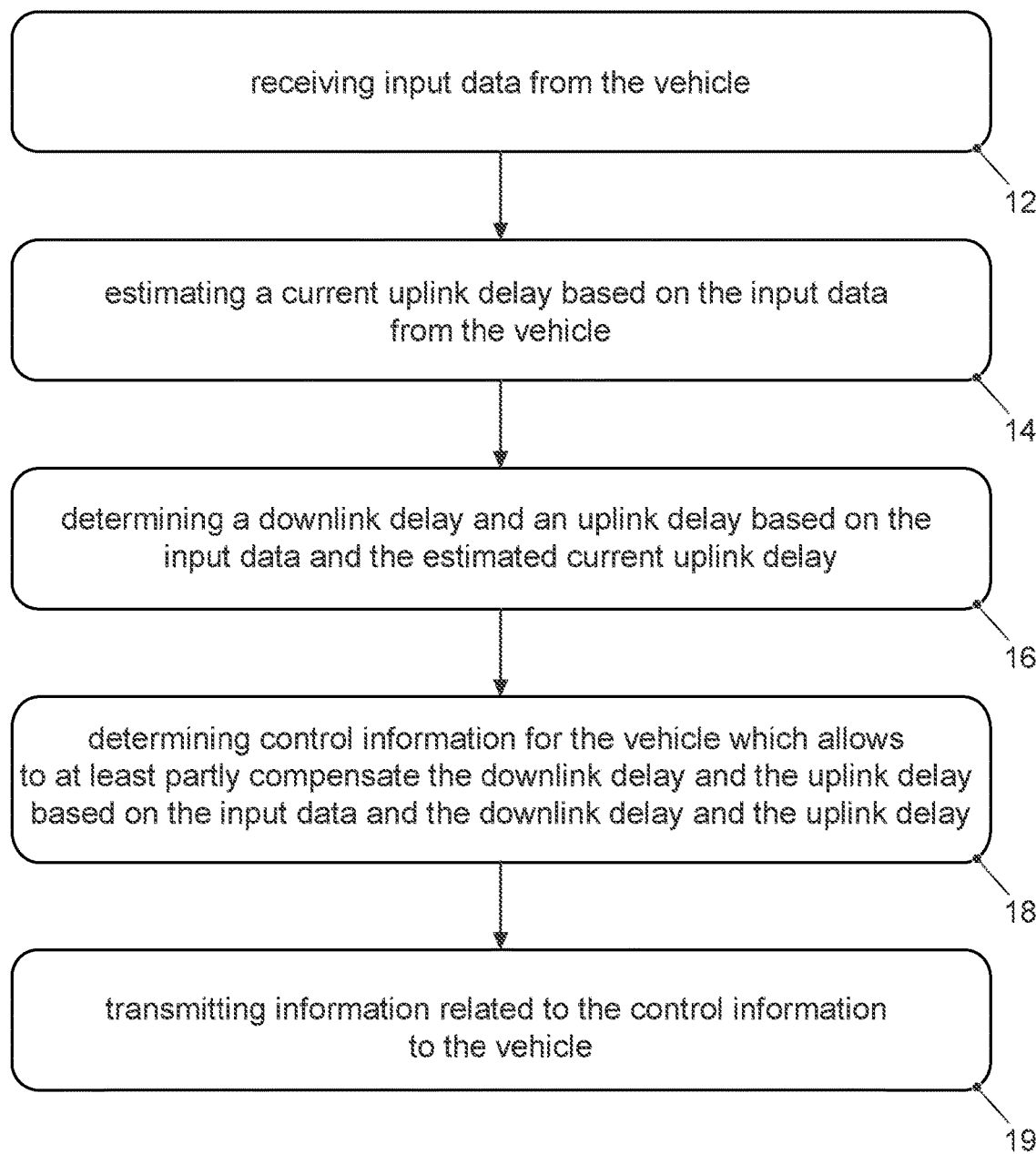
FIG. 1 illustrates a block diagram of an exemplary embodiment of a method for a command center configured to teleoperate a transportation vehicle.

Vehicular communication is a field of research and development. To enable an autonomous or semi-autonomous driving of transportation vehicles, transportation vehicles are expected to use Vehicle-to-Vehicle-communication (V2V) and Vehicle-to-Network (V2N) communication, e.g., to coordinate driving maneuvers and/or to receive teleoperated driving instructions. This communication is generally wireless, i.e., transportation vehicles may wirelessly communicate with other transportation vehicles in their vicinity and/or with backend services via cellular mobile communication systems.

Tele-operated driving (ToD) is getting more and more interest. The main concept of ToD is an automated vehicle (AV) remotely driven by a control/command center (CC). CC and AV may be far away from each other. They are connected via a radio communication system (e.g., 4th, 5th Generation mobile communication systems (4G, 5G)) and its backhaul. Therefore, a certain end-to-end (E2E) delay is to be expected. The CC controls the automated vehicle (AV) via remote control, directly or indirectly. In indirect control, a proposed path (trajectory) is sent to the AV, whereas in direct control the CC directly controls one or more actuators of the AV. In both cases, the E2E delay from the CC to the AV may be considered when the CC is planning a path for the transportation vehicle or when steering the transportation vehicle.

For example, 5GCroCo will trial 5G technologies in the cross-border corridor along France, Germany and Luxembourg. In addition, 5GCroCo also aims at defining new business models that can be built on top of this unprecedented connectivity and service provisioning capacity. Further information can be found on the Internet at 5gcroco.eu/.

Document EP 2 865 495 A1 discloses a robotic system, which includes a processing device and a plurality of robot actuators to cause a specified motion of the robot. The processing device responds to one or more user robot commands initiated by a control operator input at a remote-control console. A user robot command will specify a first movement of the robot from a first position to a second position. The processing device will compare a current pose of the robot to an earlier pose of the robot to determine a difference between the current pose and the earlier pose. Based on this comparing, the processing device will selectively transform the user robot command to a latency-corrected robot command which specifies a second movement for the robot which is different from the first movement.

Document EP 2 865 496 A1 describes systems and methods for increasing a predictability of Telematic Operations ("TOs") of a Teleoperation System ("TS"). The methods involve: measuring an inherent latency of a Communications Link ("CL") of TS which varies unpredictably over at least a first window of time; analyzing the inherent latency, which was previously measured, to determine a first reference value useful for increasing the predictability of the TOs; using the first reference value to select an amount of controlled latency to be added to CL at each of a plurality of time points; and adding the amount of controlled latency to CL at each of the plurality of time points so as to increase the predictability of the TOs. In some scenarios, the amount of controlled latency added at a first time point is different than the amount of controlled latency added at a second time point.

In document EP 3 339 999 A2 an operator uses a remote operation apparatus to remotely operate an operated transportation vehicle. The remote operation apparatus includes a position information processor which, based on transportation vehicle position information indicating a current position of the operated transportation vehicle and delay information indicating a delay time required for information transmission between the operated transportation vehicle and the remote operation apparatus, generates first position information indicating a first predicted position of the operated transportation vehicle from the current position of the operated transportation vehicle considering the delay time; based on obstacle position information indicating a current position of at least one obstacle around the operated transportation vehicle acquired by the operated transportation vehicle and the delay information, generates second position information indicating a second predicted position of the at least one obstacle from the time of the current position of the obstacle considering the delay time; and outputs the first and second position information.

Document US2019/0168769 A1 describes a concept, in which a steering control delay is measured, where the steering delay represents the delay between the time of issuing a steering control command and the time of a response from one or more wheels of an autonomous transportation vehicle. A speed control delay is measured between the time of issuing a speed control command and the time of a response from one or more wheels of the autonomous transportation vehicle or the time of supplying pressure to the gas pedal or brake pedal. In response to a given route subsequently, an overall system delay is determined based on the steering control delay and the speed control delay using a predetermined algorithm. Planning and control data is generated in view of the system delay for operating the autonomous transportation vehicle.

Document US 2017/0230803 A1 discloses a method for supporting vehicular communications in a cellular network, which includes analyzing whether an incoming message is a transportation vehicle data message or a base station control message. In the case that the incoming message is a base station control message of a specific base station: updating and/or storing the network operating parameters of the specific base station for controlling a transmission of selected transportation vehicle data messages to the specific base station. In the case that the incoming message is a vehicle data message of a sending transportation vehicle; determining at least one destination transportation vehicle out of a provided and/or stored list of registered transportation vehicles participating in the vehicular communication. The method also includes transmitting the vehicle data message to the at least one destination transportation vehicle dependent on the at least one operating parameter of a respective receiving base station the at least one destination transportation vehicle is connected to.

There is a demand for an improved concept for communication in ToD.

Disclosed embodiments are based on the finding that an E2E delay consists of network delay, radio access technology (RAT) delay, and a delay from the communication unit (CCU) to the actuator of the AV. Due to difference in delay sources, a certain variation of the delay is expected. A maneuvering in direct control is therefore challenging for the CC. It is a finding of disclosed embodiments that a prediction of communication delays for ToD can be carried out based on accordingly communicated information. Respective control information can then be determined which at least partly compensates the delays or latency.

A method for a control/command center, which is configured to teleoperate a transportation vehicle, is provided by exemplary embodiments. The method comprises receiving input data from the transportation vehicle and estimating a current uplink delay based on the input data from the transportation vehicle. The method further comprises determining an estimated downlink and uplink delay based on the input data and the estimated current uplink delay. The method further comprises determining control information for the transportation vehicle which allows to at least partly compensate the estimated downlink and uplink delay. The method further comprises transmitting information related to the control information to the transportation vehicle. By determining the downlink delay and the uplink delay at the control center the control information can be provided in a way that allows compensation of the delay at the transportation vehicle.

The input data may comprise information related to time stamps of a predefined time clock, for example, a GPS time reference may be used at the transportation vehicle and the control center. The estimating of the current uplink delay may be based on the information related to the time stamps. By using a common reference and time stamps the control center can estimate the uplink delay by comparing the time stamps to the time reference.

In some disclosed embodiments the input data may comprise information related to one or more previous downlink delays and the determining of the estimated downlink and uplink delay is further based on the information related to the one or more previous downlink delays. An estimation of the downlink delays may be improved by provision of the measured or estimated previous downlink delays from the transportation vehicle.

Additionally or alternatively, the determining of the estimated downlink and uplink delay may be further based on information related to one or more previous uplink delays. Previous uplink delays could, for example, be available at the control center or stored values could be used. Taking into account previous delays may improve an estimation accuracy of a current delay.

The input data may further comprise information related to a geographical location of the transportation vehicle. The determining of the estimated downlink and uplink delay may then be further based on at least one historical uplink delay and/or at least one historical downlink delay stored for the geographical location. Using a delay map with historical delay data may further improve estimation of a current delay.

At least in some disclosed embodiments the method may further comprise storing information related to the estimated uplink delay, an estimated downlink delay, and/or the estimated downlink and uplink delay together with the information related to the geographical location. Disclosed embodiments may hence contribute to generate and improve historical/statistical location-based delay data.

The determining of the control information may comprise determining the control information for a future time point to at least partly compensate the estimated downlink and uplink delay. The control information may comprise at least one time stamp as time reference for the control information. By generating the control information for application at a future point in time, delays can be compensated at the transportation vehicle as the control information is determined/meant to be applied at a time after its receipt.

As a further disclosed embodiment, the determining of the control information may comprise determining different control information for at least two different future time points to enable time interpolation or extrapolation of the control information at the transportation vehicle for at least partly compensating the downlink delay. Control information for two or more time points may enable accurate prediction (interpolation or extrapolation) of the control information for a number of time points, e.g., for a time period.

The input data may comprise one or more elements of the group of information related to video data obtained at the transportation vehicle, information related to sensor data obtained at the transportation vehicle, information related to geographical data of the transportation vehicle, information related to objects in an environment of the transportation vehicle, and information related to a downlink delay experienced at the transportation vehicle. With the input data and the delay estimation an accurate status of the transportation vehicle and its environment may be determined at the control center.

Disclosed embodiments further provide a method for a transportation vehicle, which is configured to be teleoperated by a command center. The method comprises transmitting input data to the command center and receiving control information for teleoperating the transportation vehicle from the control center. The control information comprises at least on time stamp of a predefined time clock. The method comprises determining a delay compensation for the control information based on the time stamp to obtain delay compensated control information. The method further comprises applying the delay compensated control information to the transportation vehicle. At least a downlink delay estimation can be enabled by using at least one time stamp in the control information. The time stamp can be compared to a reference clock and an accurate application time for the control information can be determined.

The time stamp of the control information may indicate a future point in time and the determining of the delay compensation may comprise delaying the application of the control information until the future time stamp. The delay may be compensated by determining and using control information that is applicable in the future, after it was received.

The control information may comprise at least two time stamps and the determining of the delay compensation comprises interpolating or extrapolating the control information based on the at least two time stamps to an application time point of the control information. Disclosed embodiments may enable an accurate adaptation of the control information to its application time.

Disclosed embodiments further provide an apparatus for a command center, which is configured to teleoperate a transportation vehicle. Another exemplary embodiment is a command center comprising an exemplary embodiment of the apparatus. The apparatus comprises one or more interfaces for communicating with one or more transportation vehicles, and a control module configured to carry out one of the methods described herein. Yet another disclosed embodiment is an apparatus for a transportation vehicle, which is configured to be teleoperated by a command center. Another disclosed embodiment is a transportation vehicle comprising an exemplary embodiment of the apparatus. The apparatus comprises one or more interfaces for communicating with a command center, and a control module configured to carry out one of the methods described herein.

Disclosed embodiments further provide a computer program having a program code for performing one or more of the described methods, when the computer program is executed on a computer, processor, or programmable hardware component. A further exemplary embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular disclosed embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of an exemplary embodiment of a method 10 for a command center, which is configured to teleoperate a transportation vehicle. Teleoperating a transportation vehicle may be in terms of "real time" remote controlling the transportation vehicle or by providing at least path sections from a control/command center to the transportation vehicle for the transportation vehicle to follow such a path section autonomously. Both options are subject to delays and latencies at various instances in the communication system as will be detailed subsequently.

The method 10 comprises receiving 12 input data from the transportation vehicle and estimating 14 a current uplink delay based on the input data from the transportation vehicle. The method 10 comprises determining 16 an estimated downlink and uplink delay based on the input data and the estimated current uplink delay, and determining 18 control information for the transportation vehicle which allows to at least partly compensate the estimated downlink and uplink delay. The method 10 further comprises transmitting 19 information related to the control information to the transportation vehicle. For example, the input data comprises information related to time stamps of a predefined time clock. In disclosed embodiments, such a predefined time clock may be any reference clock, e.g., provided by a satellite system such as the Global Positioning System (GPS) or the Global Navigation Satellite System (GLONASS). For example, the estimating 14 of the current uplink delay is based on the information related to the time stamps.

Figure 2:
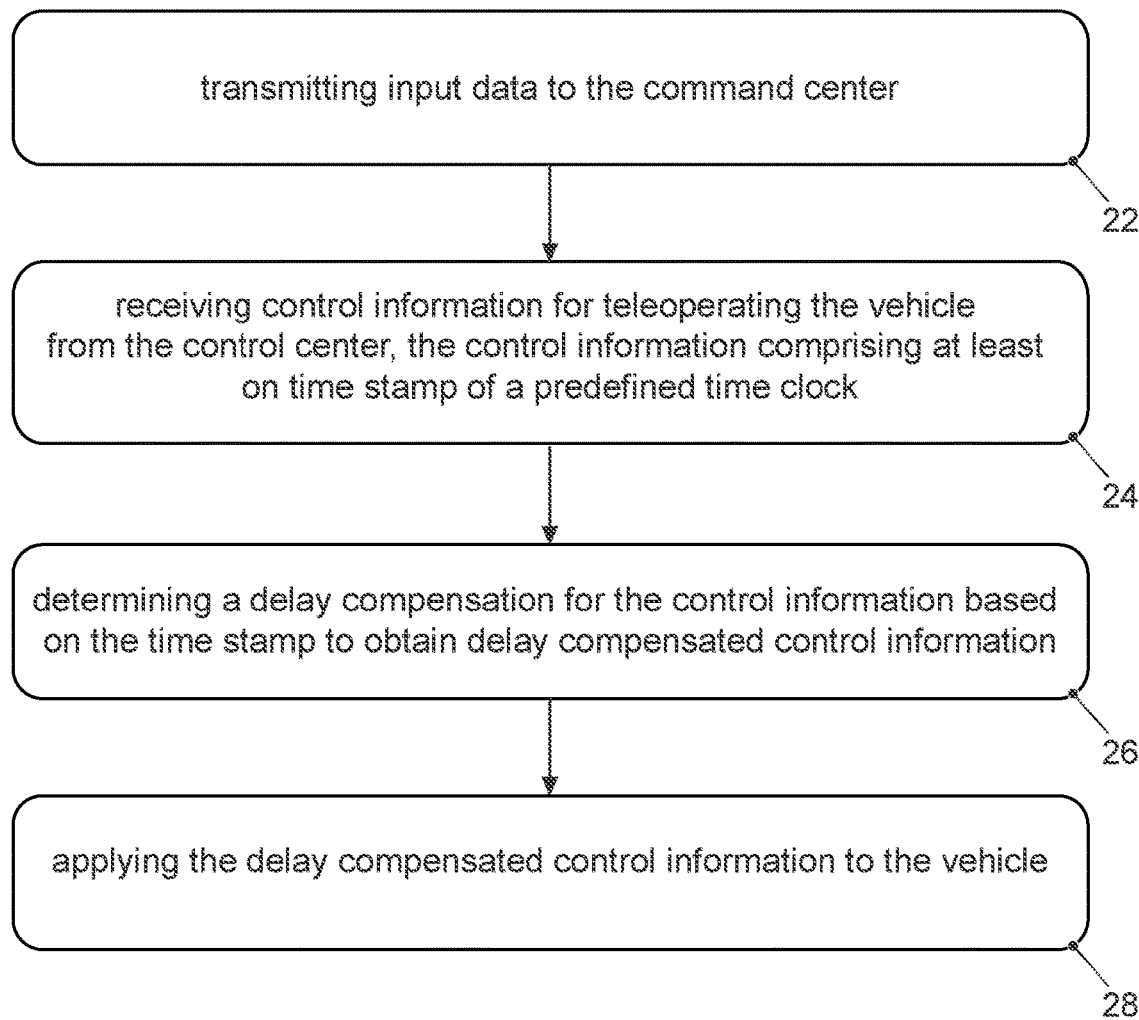
FIG. 2 illustrates a block diagram of an exemplary embodiment of a method for a transportation vehicle configured to be teleoperated by a command center.

FIG. 2 illustrates a block diagram of an exemplary embodiment of a method 20 for a transportation vehicle configured to be teleoperated by a command center. The method 20 comprises transmitting 22 input data to the command center and receiving 24 control information for teleoperating the transportation vehicle from the control center. The control information comprises at least on time stamp of a predefined time clock. The method 20 further comprises determining 26 a delay compensation for the control information based on the time stamp to obtain delay compensated control information, and applying 28 the delay compensated control information to the transportation vehicle. The applying 28 of the delay compensated control information may comprise controlling actuators of the transportation vehicle in line with time compensated control information.

As outlined above the control information may comprise direct control information, such as steering commands, or indirect control information, such as instructions to follow a certain path or path section.

Figure 3:
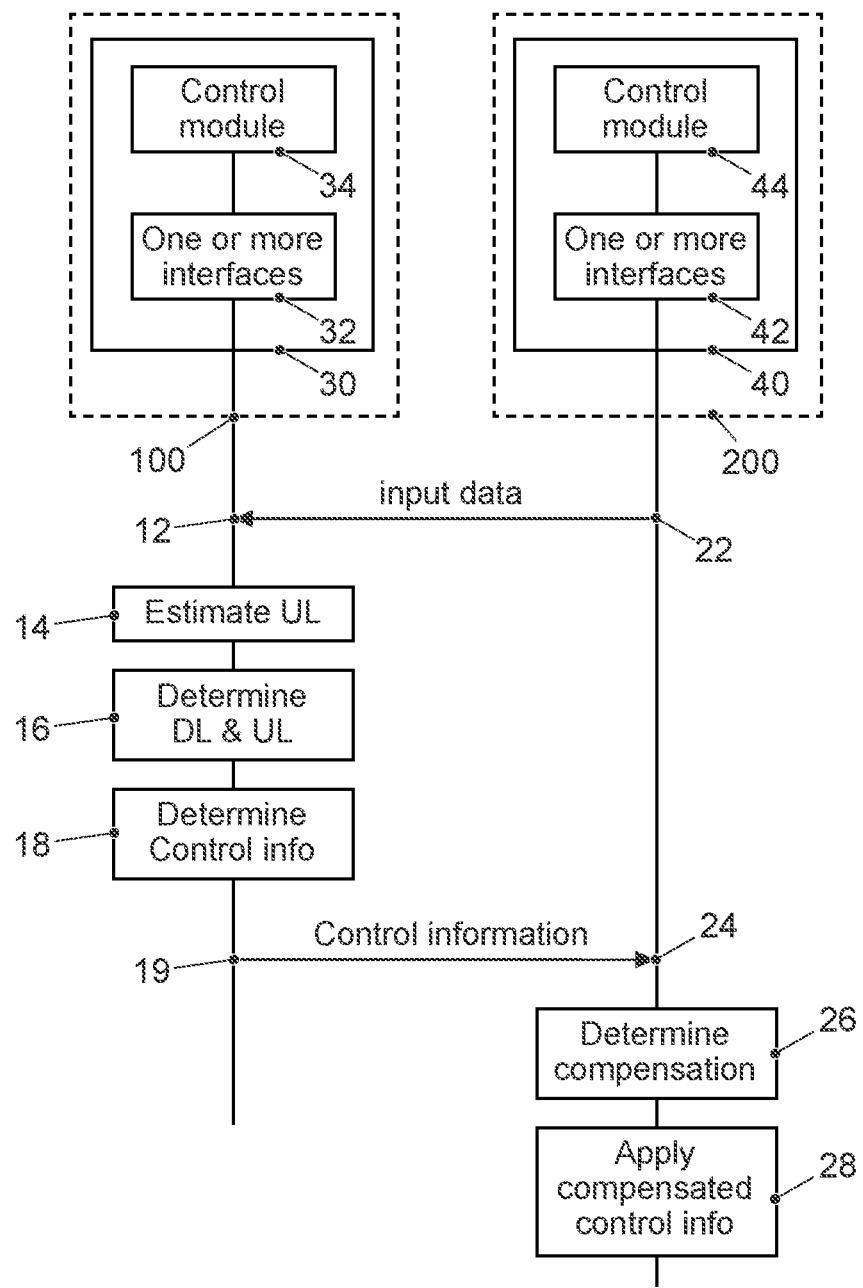
FIG. 3 illustrates block diagrams of exemplary embodiments for apparatuses for a command center and for a transportation vehicle, an exemplary embodiment of a command center, an exemplary embodiment of a transportation vehicle, and an exemplary embodiment of a system.

FIG. 3 illustrates block diagrams of disclosed embodiments for apparatuses 30, 40 for a command center 100 and for a transportation vehicle 200, an exemplary embodiment of a command center 100, an exemplary embodiment of a transportation vehicle 200, and an exemplary embodiment of a system 400.

FIG. 3 shows an apparatus 30 for a command/control center 100, which is configured to teleoperate a transportation vehicle 200. The apparatus 30 comprises one or more interfaces 32 for communicating with one or more transportation vehicles. The one or more interfaces 32 are coupled with a control module 34, which is configured to carry out one of the methods 10 described herein.

FIG. 3 further illustrates an apparatus 40 for a transportation vehicle 200, which is configured to be teleoperated by the command center 100. The apparatus 40 comprises one or more interfaces 42 for communicating with the command center 200. The apparatus 40 further comprises a control module 44, which is coupled to the one or more interfaces 42 and which is configured to carry out one of the methods 40 described herein. FIG. 3 further depicts as optional components further disclosed embodiments of a command or control center 100 comprising an exemplary embodiment of the apparatus 30, and a transportation vehicle 200 comprising an exemplary embodiment of apparatus 40. A system 400 comprising at least one disclosed embodiment of the apparatus 30 and at least one disclosed embodiment of the apparatus 40 is yet another exemplary embodiment.

The apparatuses 30, 40, the command center 100 and the transportation vehicle 200 may communicate through a mobile communication system 400. The mobile communication system 400, as shown in FIG. 3, may, for example, correspond to one of the Third Generation Partnership Project (3GPP)-standardized mobile communication networks, where the term mobile communication system is used synonymously to mobile communication network. The messages (input data, control information) may hence be communicated through multiple network nodes (e.g., internet, router, switches, etc.) and the mobile communication system 400, which generates the delay or latencies considered in disclosed embodiments. The uplink direction refers to the direction from a transportation vehicle 200 to the command center and the downlink direction refers from the command center 100 to the transportation vehicle 200.

The mobile or wireless communication system 400 may correspond to a mobile communication system of the 5th Generation (5G, or New Radio) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component, such as a base station transceiver, a relay station or a UE, e.g., coordinating service provision in a cluster or group of multiple UEs/transportation vehicles. A base station transceiver can be operable or configured to communicate with one or more active mobile transceivers/transportation vehicles and a base station transceiver can be located in or adjacent to a coverage area of another base station transceiver, e.g., a macro cell base station transceiver or small cell base station transceiver. Hence, disclosed embodiments may provide a mobile communication system 400 comprising two or more mobile transceivers/transportation vehicles 200 and one or more base station transceivers, wherein the base station transceivers may establish macro cells or small cells, as e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a transportation vehicle, a road participant, a traffic entity, traffic infrastructure etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a gNodeB, a Base Transceiver Station (BTS), an access point, a remote radio head, a relay station, a transmission point, etc., which may be further subdivided in a remote unit and a central unit.

A mobile transceiver or transportation vehicle 200 can be associated with a base station transceiver or cell. The term cell refers to a coverage area of radio services provided by a base station transceiver, e.g., a NodeB (NB), an eNodeB (eNB), a gNodeB, a remote radio head, a transmission point, etc. A base station transceiver may operate one or more cells on one or more frequency layers, in some disclosed embodiments a cell may correspond to a sector. For example, sectors can be achieved using sector antennas, which provide a characteristic for covering an angular section around a remote unit or base station transceiver. In some disclosed embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

The apparatuses 30, 40 may be comprised in a server, a base station, a NodeB, a UE, a relay station, or any service coordinating network entity in disclosed embodiments. It is to be noted that the term network component may comprise multiple sub-components, such as a base station, a server, etc.

In exemplary embodiments, the one or more interfaces 32, 42 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 32, 42 may comprise further components to enable according communication in the mobile communication system 400, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 32, 34 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 32, 42 may serve the purpose of transmitting or receiving or both, transmitting and receiving, information, such as information, input data, control information, further information messages, etc.

As shown in FIG. 3 the respective one or more interfaces 32, 42 are coupled to the respective control modules 34, 44 at the apparatuses 30, 40. In exemplary embodiments, the control modules 34, 44 may be implemented using one or more processing units, one or more processing devices, any method or mechanism for processing, such as a processor, a computer or a programmable hardware component being operable with accordingly adapted software. In other words, the described functions of the control modules 32, 44 may as well be implemented in software, which is then executed on one or more programmable hardware components. Such hardware components may comprise a general-purpose processor, a Digital Signal Processor (DSP), a micro-controller, etc.

In exemplary embodiments, communication, i.e., transmission, reception or both, may take place among mobile transceivers/transportation vehicles 200 directly, e.g., forwarding input data or control information to/from a control center 100. Such communication may make use of a mobile communication system 400. Such communication may be carried out directly, e.g., by Device-to-Device (D2D) communication. Such communication may be carried out using the specifications of a mobile communication system 400. An example of D2D is direct communication between transportation vehicles, also referred to as Vehicle-to-Vehicle communication (V2V), car-to-car, Dedicated Short Range Communication (DSRC), respectively. Technologies enabling such D2D-communication include 802.11p, 3GPP systems (4G, 5G, NR and beyond), etc.

In disclosed embodiments, the one or more interfaces 32, 42 can be configured to wirelessly communicate in the mobile communication system 400. To do so, radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc. For example, in direct Cellular Vehicle-to-Anything (C-V2X), where V2X includes at least V2V, V2-Infrastructure (V2I), etc., transmission according to 3GPP Release 14 onward can be managed by infrastructure (so-called mode 3) or run in a UE.

As further illustrated in FIG. 3, the methods 10, 20 may be carried out at the apparatuses 30, 40 at the control center 100 and the transportation vehicle 100. FIG. 3 hence illustrates an exemplary embodiment of a method for a system, system method, respectively. In an exemplary embodiment the control center 100 receives 12 input data that the transportation vehicle has transmitted 22. Based on the input data a current uplink (UL) delay can be estimated 14. An overall delay (end-to-end, downlink and uplink (UL & DL)) can be further estimated 16 based on the input data and the estimated current uplink delay. Control information is then determined 18 for the transportation vehicle. The control information allows to at least partly compensate the estimated downlink and uplink delay. The control information is then transmitted 19 to the transportation vehicle 100. At the transportation vehicle 100 the control information is received 24. Base thereon delay compensated control information can be determined 26 and applied 28.

Figure 4:
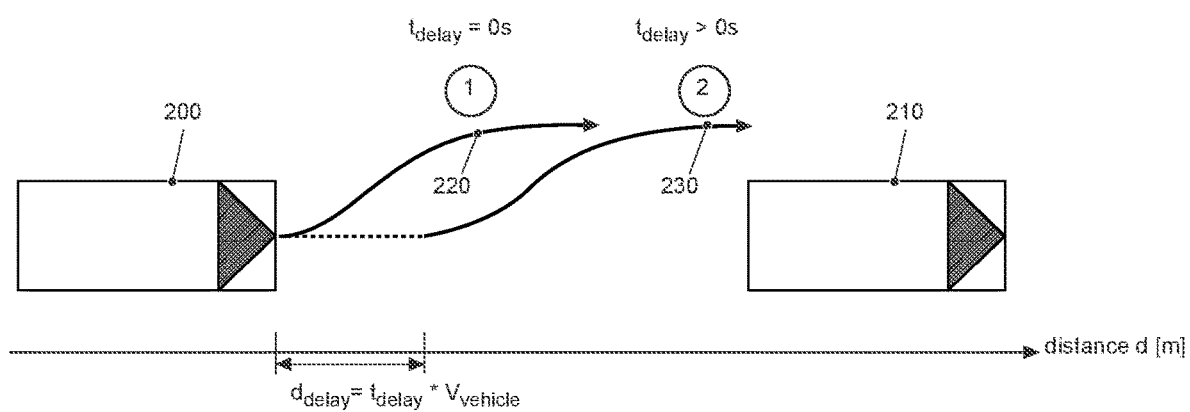
FIG. 4 illustrates a transportation vehicle travelling along different paths based on communication delays.

FIG. 4 illustrates a transportation vehicle 200 travelling along different paths depending on communication delays. The transportation vehicle 200 is teleoperated and should be maneuvered to pass the obstacle 210, which may be a parking or slow-moving transportation vehicle. FIG. 4 shows two paths 220, 230. Path 220 is the theoretical path without delay, tdelay=0. Path 230 is the realistic path having a delay tdelay>0. The distance traveled by the transportation vehicle 100 during the delay can be determined by ddelay=tdelay*vvehicle, where vvehicle indicates the velocity/speed of the transportation vehicle 100.

First, a constant delay tdelay is assumed. By knowing this delay in advance, the command center (CC) 100 could take it into account when planning or steering the transportation vehicle 200. Furthermore, depending on the delay profile, an appropriate control mode may be selected (direct or indirect control (trajectory based)). Second, if the delay is not constant anymore the maneuvering of the autonomous vehicle (AV) becomes difficult.

Figure 5:
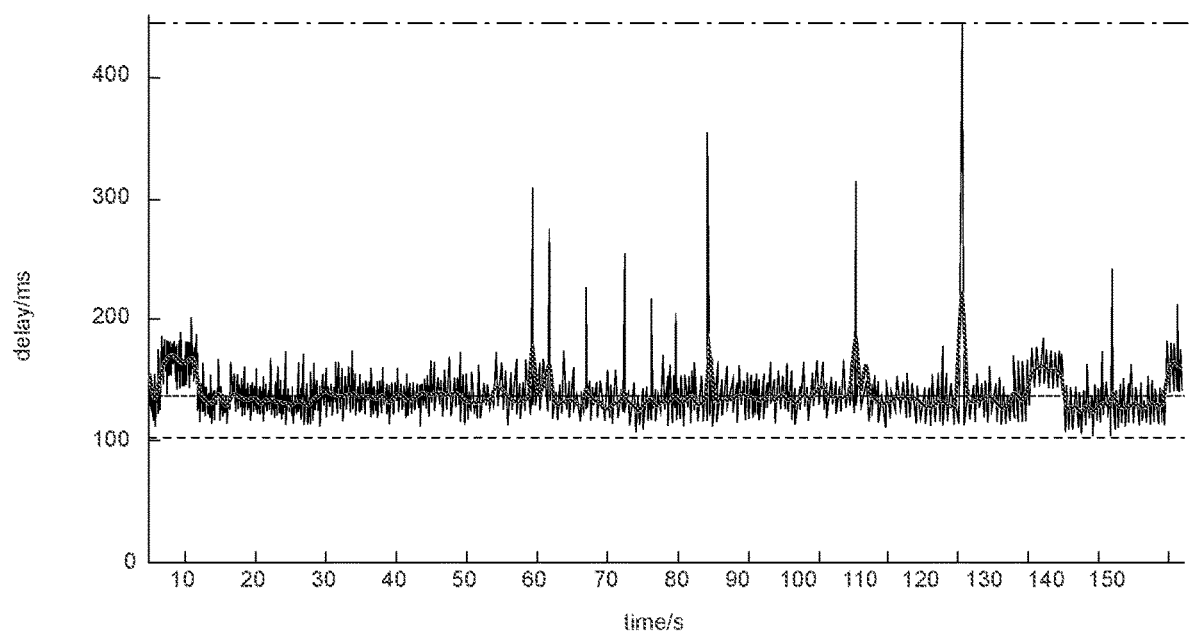
FIG. 5 illustrates delay measurements over time.

FIG. 5 illustrates delay measurements over time. FIG. 5 shows end-to-end (E2E) delays between a CC 100 and an AV 200 measured by the technical university of Munich. The viewgraph depicts delay (latency)/ms versus time/s. These measurements reveal high delays and a certain variation of the delay. The average E2D latency including data processing and transmission is about 138 ms. A maximum delay is about 445 ms and a minimum is about 102 ms. The center line depicts the filtered version of the individual delays.

FIG. 5 does not consider the delays from a communication unit (CCU) of the AV 200 to the actuator of the AV (delays inside of the AV 200). Furthermore, uplink (UL) latency and down link (DL) latencies may be distinguished in disclosed embodiments. On the one hand UL and DL delays may be distinguished in terms of latency quantification: the UL latency can be estimated and the DL latency for the control information can be predicted. On the other hand, UL and DL delays may be distinguished in terms of control: direct control and indirect control.

Disclosed embodiments take a delay of the control information into account at the CC 100. Moreover, variations of the delay can be compensated. For example, delays may be predicted (known in advance) to maneuver the AV 200 under certain circumstances. An appropriate control mode in the DL may be selected and a speed of the ToD vehicle 200 may be adapted. UL delays may be estimated by the CC 100 with a time stamp provided by the AV 200. DL delays may be predicted.

In the following, the methods 10 and 20 will be described in more detail in an exemplary embodiment. The CC 100 receives some sensor input from the AV 200 as input data. Along with this time-stamped data, the AV 200 also sends the history of the downlink latencies it experienced with the previous communication from the CC 100. The input data in this disclosed embodiment comprises information related to one or more previous DL delays (history of DL delays). The determining 16 of the estimated downlink and uplink delay is further based on the information related to the one or more previous downlink delays. For example, the information related to the previous DL delays comprises DL delay in the latest past, e.g., during the last 1 s, 5 s, 10 s, 30 s, 60 s.

The input data may comprise one or more elements of the group of information related to video data obtained at the transportation vehicle 200, information related to sensor data obtained at the transportation vehicle 200, information related to geographical data of the transportation vehicle 200, information related to objects in an environment of the transportation vehicle 200, and information related to a downlink delay experienced at the transportation vehicle 200. This information may contribute to estimate a (current) replica of the environment of the transportation vehicle 200 at the CC 100.

When processing the input data from the AV 200, the CC 100 has following data:
Sensor data (GPS position, video stream etc.),
Timeseries of the previous downlink latencies (obtained via feedback from AV 200),
Timeseries of the previous and current uplink latencies obtained via time stamp analysis, and
Database of all timeseries and according positions of previous communications from any AV.

Hence, the determining 16 of the estimated downlink and uplink delay is further based on information related to the one or more previous uplink delays. Such information may be evaluated from experience, e.g., determined UL delays may be tracked. For example, the previous UL delays may be historical data from the same link, i.e., UL delays in the latest past, e.g., during the last 1 s, 5 s, 10 s, 30 s, 60 s.

As outlined above, the input data may comprise information related to a geographical location of the transportation vehicle. The determining 16 of the estimated downlink and uplink delay is further based on at least one historical uplink delay and/or at least one historical downlink delay stored for the geographical location. Therefore, in some exemplary embodiments the previous UL and/or DL delays may be from different links but stored in the past for the same location. The method 10 may therefore further comprise storing information related to the estimated uplink delay, an estimated downlink delay, and/or the estimated downlink and uplink delay together with the information related to the geographical location. This way, such information can be made available for future delay estimation/prediction for transportation vehicles at the same location being controlled by the same CC 100.

In the following the methods 10, 20 at the CC 100 and Av 200 may be divided in three operations:
1. (CC 100) Compensate the sensor input data using the measured current uplink delay,
2. (CC 100) Predict the downlink latency using the two timeseries and the historical data (e.g., from a data base), and propose some control input for one or more cases depending on the latency and send this to AV 200, and
3. (AV 200) Measure the downlink delay and look in the data transmitted by CC for the corresponding control data.

From the perspective of the CC 100 (method 10) the determining 18 of the control information may comprise determining the control information for a future time point to at least partly compensate the estimated downlink and uplink delay. The control information comprises at least one time stamp as time reference for the control information. In such an exemplary embodiment the control information may be determined for a future point in time considering the delays. The AV 200 can then receive the control information and apply it at the future time point. At the AV 200 (method 20) the time stamp of the control information indicates the future point in time. The determining 26 of the delay compensation then comprises delaying the application of the control information at the AV 200 until the future time stamp.

In further disclosed embodiments control information may be determined and provided for two or more time points. At the CC 100 (method 10) the determining 18 of the control information then comprises determining different control information for at least two different future time points to enable time interpolation or extrapolation of the control information at the transportation vehicle 200 for at least partly compensating the downlink delay. The determining 26 of the delay compensation on the AV 200 side comprises interpolating or extrapolating the control information based on the at least two time stamps to an application time point of the control information.

Interpolation/Extrapolation means that estimated control information can be determined for a time stamp for which no control information is explicitly available or explicitly transmitted. Based on at least two supporting points provided with the control information, the control information can at least be linearly interpolated/extrapolated. In further disclosed embodiments higher order interpolation/extrapolation is also conceivable.

The methods 10, 20 may be summarized as follows:
The AV 200 provides sensor data and feedback of previous downlink latencies to the CC 100. The CC 100 measures the current uplink latency and "projects" the scene obtained from the AV 200. In other words, at the CC 100 the situation of the AV 200 may be recreated (generation of a replica), e.g., displayed to an operator. Due to the UL delay such scene is already delayed and may be compensated, e.g., by predicting a current scene based on the delayed scene. For example, if there is a moving object in the scene and the UL delay is estimated to be 100 ms, then the movement of the object in 100 ms can be predicted and its location can be corrected accordingly.

Prediction in this sense may mean projecting moving objects in their displacement direction using the uplink latency and let static objects rest at their original place. The CC 100 may then use the projected scene to provide its control input. For example, the timeseries of current and past uplink latencies and the timeseries of past downlink latencies may be used to predict the latency of the downlink. This operation can also make use of the historical, spatial data of all communication with other AV. The spatial data may be a database of past delays for that location, time of day, load situation in the network, etc. Indeed, in some exemplary embodiments the pattern in the timeseries can be matched with patterns in the spatial database.

Figure 6:
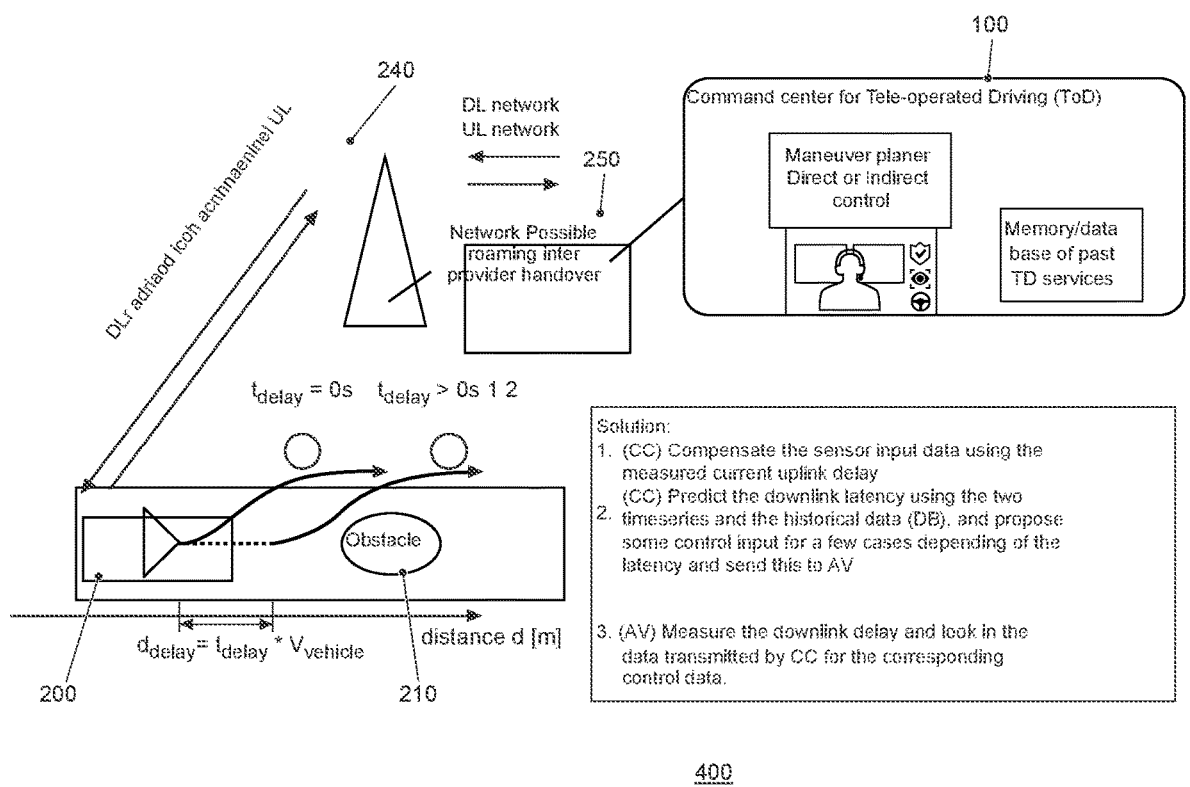
FIG. 6 illustrates a system overview for ToD with delay compensation in an exemplary embodiment.

The CC 100 then compensates the control input for a set of latencies between 0 and the estimated maximum latency and sends it to the AV 200 as well as the time operations of the control input generation. The AV 200 receives this list of inputs and matches the experienced downlink latency to the corresponding control input. It "interpolates" the input if required. This process may be repeated in a loop. FIG. 6 illustrates a system overview for ToD with delay compensation in an exemplary embodiment.

FIG. 6 shows at the lower left a similar scenario as shown in FIG. 4 with an obstacle 210. The AV 200 communicates via UL and DL radio channel with a base station 240, e.g., an eNB or a gNB. On the wired side of the base station 210 there is an intermediate network 250, which may comprise multiple other networks, e.g., one or more core networks of mobile service providers (potential roaming scenario), the internet, an intranet of the CC 100 operator and finally the CC100. Together these network nodes constitute a mobile communication system 400.

The following method is another exemplary embodiment:
1. The network may estimate the mean delays with via predicted quality of service (PQoS→138 ms, see FIG. 5);
2. The CC 100 increases this delay to for e.g., 160 ms and calls it ToD delay compensation (TDDC);
3. The TDDC of 160 ms is taken into account at the CC 100. This means that the remote driver at CC 100 is seeing the impact of delay to the maneuver planning at his monitor. See FIG. 4 path two 230. Where the path is delayed by TDDC; and
4. The control data (information) is sent with a time stamp to the AV 200. The AV 200 reads this time stamp and delays the control if the received control message time stamp is smaller than TDDC (160 ms).

In a further disclosed embodiment, predicted delay of the DL at the CC 100 is used and more control commands (control information for different time points) are sent and the AV 200 interpolates/extrapolates them.

1. The network may estimate the mean delay with via PQoS→138 ms, see FIG. 5;
2. The CC 100 sends a control command for the expected delays of for e.g., 120 ms, 150 ms, 180 ms; and
3. All three expected delays: 120 ms, 150 ms, and 180 ms are taken into account at the CC 100. This means that the remote driver at CC 100 sees the impact of the delay to the maneuver planning on his monitor. See FIG. 4 path two 230. Where the path is delayed by TDDC.

All control data is sent with a time stamp to the AV 200. The AV 200 is reading this time stamp and is able to determine whether it uses one of the control data if the delay fits to the estimated one from the DL (e.g., 150 ms) or the AV 200 uses two points and interpolates/extrapolates the control command (if it the delay is e.g., 170 m).

Summarizing, the CC 100 may compensate the sensor input data using the measured current uplink delay. The CC 100 may then predict the downlink latency using the two time series and the historical data from a data base and proposes some control input for a few cases depending on the latency and sends it to the AV 200. The AV 200 measures the downlink delay and looks in the data transmitted by the CC 100 for the corresponding control data.

In disclosed embodiments, the CC 100 and an AV 200 may be connected via a radio communication system (e.g., 4G, 5G) 400. The CC 100 controls the AV 200 via remote control. A certain E2E high variable delay is expected, which is confirmed by measurements, cf. FIG. 5.

The E2E delay may, for example, at least comprise
1) a core network delay (with possible inter-provider or even cross-border handover);
2) a radio access network (RAN) with radio access technology (RAT) delay; and
3) a delay between a communication units (CCU) of the AV 200 to an actuator of the AV.

Possible "parameters" used in exemplary embodiments are a delay "profile", e.g., a curve, an expected curve, a time series, an actual pQoS parameter. A further parameter is a control mode of the remotely driven AV 200: direct or indirect (trajectory based). Depending on a delay profile, direct control may be stricter as it requires very low E2D latencies in both directions. Yet another parameter is the control data sent in the DL from the CC 100 to the remotely driven AV 200. This data may comprise instructions depending on the control mode. For indirect control, the AV 200 receives trajectories on a certain time interval. Hence, the delays of the instructions from the CC 100 may be compensated at the AV 200 in these intervals. For direct control, the AV 200 receives direct instructions from the CC 100 like e.g., steer the wheels by 3 degrees to the right and therefore also the received instructions with the delay need to be compensated at the AV 200.

As outlined above and indicated by FIG. 5 measurements show high delays and a certain variation in the delay. UL latency and DL latency can be distinguished in disclosed embodiments:
UL: video streaming/data, and or objects from AV 200 to CC 100; and
DL: control data from CC 100 to AV 200.

On the one hand, in terms of latency quantification: UL latency can be estimated (the AV 200 sends the remote sensing data as video data with a time stamp) and DL latency for the control information might be predicted to send the right instructions (instructions with the right timing) to the AV 200.

Disclosed embodiments may use
a) Prediction of delay
  a. UL delay may be estimated by the CC 100 with a time stamp from the AV 200
  b. DL delay may be predicted using historical data
b) Compensation of high variable delay according to the above disclosed embodiments
  a. Using the measured current UL delay
  b. Predicting the DL delay using 2 timeseries
    (a. previous DL latency; and
    b. previous and current UL latency)=historical data
c) Proposing (CC 100) some control input to the AV 200, (control data, e.g., 3 degrees for the trajectory)
d) Transmitting the "some control input" to AV 200
e) Measuring DL delay by AV 200 f) "Look" by AV 200 into the received "some control input" from CC 100

Disclosed embodiments may provide the following methods:

A method 10 executed by a CC 100 for controlling the trajectory of an AV 200, comprising a. Receiving (sensor) input data from an AV 200;
 b. Measuring the current UL delay with time stamps from the AV 200;
 c. Processing the input data and the measured current UL delay (projecting the scene);
 d. Determining an E2E latency between CC 100 and AV 200 according to processed input data;
 e. Providing "control input" to the AV according the determined E2E latency;
 f. Compensating delay of data, which is the control input of the AV from the CC the "control input"; and
 g. Controlling the trajectory of the AV based on the determined E2E latency and the provided "control input".

The sensor input comprises timestamped data. The method may further comprise receiving a history of previous downlink latencies from the AV 200 in form of time series. The input data may be one or more of a GPS geographical position, video stream, sensor data, etc. The processing may comprise analyzing time-stamped data of previous and current uplink latency. The input data may be a GPS position of the AV 200. The method may further comprise storing the determined latency for the received GPS position. The determining of the E2E latency may be based on stored DL and UL latencies, potentially also from other AVs, for the received GPS position. The providing of "control input" in form of "control data" may be achieved by sending the control data with a time stamp. The compensating of the "control input" may comprise sending at least one "control data" to the AV 200 with a future time stamp that lies further in the future than the determined E2E latency. Compensating the "control input" may comprise sending more than one "control data" to the AV 200.

A further exemplary embodiment is a method 20 executed by an AV 200, comprising a. Receiving control data from an CC 100;
 b. Processing the received control data; and
 c. Executing a maneuver according to the processed received control data.

The processing may comprise interpolating between the received control data. The executing of the maneuver takes into account a delay between communication unit of the AV 200 and an actuator of the AV 200.

As already mentioned, in exemplary embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The exemplary embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure. Furthermore, all examples recited herein are principally intended expressly to be only for pedagogical purposes to aid the reader in understanding the principles of the disclosure and the concepts contributed to furthering the art and are to be construed as being without limitation to such specifically recited examples and conditions.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate disclosed embodiment. While each claim may stand on its own as a separate disclosed embodiment, it is to be noted that—although a dependent claim may refer in the claims to a specific combination with one or more other claims—other exemplary embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS 10 method for a command center configured to teleoperate a transportation vehicle
12 receiving input data from the transportation vehicle
14 estimating a current uplink delay based on the input data from the transportation vehicle
16 determining an estimated downlink and uplink delay based on the input data and the estimated current uplink delay
18 determining control information for the transportation vehicle which allows to at least partly compensate the estimated downlink and uplink delay
19 transmitting information related to the control information to the transportation vehicle
20 method for a transportation vehicle configured to be teleoperated by a command center
22 transmitting input data to the command center
24 receiving control information for teleoperating the transportation vehicle from the control center
26 determining a delay compensation for the control information based on the time stamp to obtain delay compensated control information
28 applying the delay compensated control information to the transportation vehicle
30 apparatus for a command center configured to teleoperate a transportation vehicle
32 one or more interfaces
34 control module
40 apparatus for a transportation vehicle configured to be teleoperated by a command center
42 one or more interfaces
44 control module
100 command/control center
200 transportation vehicle
210 obstacle
220 path without delay
230 path with delay
240 base station
250 intermediate network
400 mobile communication system

The invention claimed is:

1. An apparatus for a command center, the apparatus being configured to teleoperate a transportation vehicle, the apparatus comprising:
one or more interfaces for communicating with one or more transportation vehicles; and
a control module to:
receive input data from the transportation vehicle;
estimate a current uplink delay based on the input data from the transportation vehicle;
determine an estimated downlink and uplink delay based on the input data and the estimated current uplink delay;
determine control information for the transportation vehicle to at least partly compensate the estimated downlink and uplink delay; and
transmit the control information to the transportation vehicle,
wherein the determining of the control information comprises determining the control information for a future time point to at least partly compensate the estimated downlink and uplink delay,
wherein the control information comprises at least one time stamp as time reference for the control information, and
wherein the determining of the control information comprises determining different control information for at least two different future time points to enable time interpolation or extrapolation of the control information at the transportation vehicle for at least partly compensating the downlink delay.

2. An apparatus for a transportation vehicle to be teleoperated by a command center, the apparatus comprising:
one or more interfaces for communicating with the command center; and
a control module to:
transmit input data to the command center;
receive control information for teleoperating the transportation vehicle from the control center, the control information comprising at least on time stamp of a predefined time clock;
determine a delay compensation for the control information based on the time stamp to obtain delay compensated control information; and
apply the delay compensated control information to the transportation vehicle,
wherein the determining of the control information comprises determining the control information for a future time point to at least partly compensate the estimated downlink and uplink delay,
wherein the control information comprises at least one time stamp as time reference for the control information, and
wherein the control information comprises at least two time stamps and wherein the determining of the delay compensation comprises interpolating or extrapolating the control information based on the at least two time stamps to an application time point of the control information.

3. A method for a command center to teleoperate a transportation vehicle, the method comprising:
receiving input data from the transportation vehicle;
estimating a current uplink delay based on the input data from the transportation vehicle;
determining an estimated downlink and uplink delay based on the input data and the estimated current uplink delay;
determining control information for the transportation vehicle to at least partly compensate the estimated downlink and uplink delay; and
transmitting the control information to the transportation vehicle,
wherein the determining of the control information comprises determining the control information for a future time point to at least partly compensate the estimated downlink and uplink delay and wherein the control information comprises at least one time stamp as time reference for the control information, and
wherein the determining of the control information comprises determining different control information for at least two different future time points to enable time interpolation or extrapolation of the control information at the transportation vehicle for at least partly compensating the downlink delay.

4. The method of claim 3, wherein the input data comprises information related to time stamps of a predefined time clock and wherein estimating the current uplink delay is based on the information related to the time stamps.

5. The method of claim 3, wherein the input data comprises information related to one or more previous downlink delays and wherein the determining of the estimated downlink and uplink delay is further based on the information related to the one or more previous downlink delays.

6. The method of claim 3, wherein the determining of the estimated downlink and uplink delay is further based on information related to one or more previous uplink delays.

7. The method of claim 3, wherein the input data comprises information related to a geographical location of the transportation vehicle and wherein the determining of the estimated downlink and uplink delay is further based on at least one historical uplink delay and/or at least one historical downlink delay stored for the geographical location.

8. The method of claim 7, further comprising storing information related to the estimated uplink delay, an estimated downlink delay, and/or the estimated downlink and uplink delay together with the information related to the geographical location.

9. The method of claim 3, wherein the input data comprises one or more elements of the group of information related to video data obtained at the transportation vehicle, information related to sensor data obtained at the transportation vehicle, information related to geographical data of the transportation vehicle, information related to objects in an environment of the transportation vehicle, and information related to a downlink delay experienced at the transportation vehicle.

10. A method for a transportation vehicle to be teleoperated by a command center, the method comprising:
   transmitting input data to the command center;
   receiving control information for teleoperating the transportation vehicle from the control center, the control information comprising at least on time stamp of a predefined time clock;
   determining a delay compensation for the control information based on the time stamp to obtain delay compensated control information; and
   applying the delay compensated control information to the transportation vehicle,
   wherein the determining of the control information comprises determining the control information for a future time point to at least partly compensate the estimated downlink and uplink delay,
   wherein the control information comprises at least one time stamp as time reference for the control information, wherein the control information comprises at least two time stamps, and
   wherein the determining of the delay compensation comprises interpolating or extrapolating the control information based on the at least two time stamps to an application time point of the control information.

11. The method of claim 10, wherein the time stamp of the control information indicates a future point in time and wherein the determining of the delay compensation comprises delaying the application of the control information until the future time stamp.

12. The method of claim 3, wherein the time stamp of the control information indicates a future point in time and wherein the determining of the delay compensation comprises delaying the application of the control information until the future time stamp.

13. A non-transitory computer readable medium including a computer program having a program code for performing the method of claim 3, when the computer program is executed on a computer, a processor, or a programmable hardware component.

14. A non-transitory computer readable medium including a computer program having a program code for performing the method of claim 10, when the computer program is executed on a computer, a processor, or a programmable hardware component.

15. The method of claim 10, wherein the input data comprises information related to time stamps of a predefined time clock and wherein estimating the current uplink delay is based on the information related to the time stamps.

16. The method of claim 10, wherein the input data comprises information related to one or more previous downlink delays and wherein the determining of the estimated downlink and uplink delay is further based on the information related to the one or more previous downlink delays.

17. The method of claim 10, wherein the determining of the estimated downlink and uplink delay is further based on information related to one or more previous uplink delays.

18. The method of claim 10, wherein the input data comprises information related to a geographical location of the transportation vehicle and wherein the determining of the estimated downlink and uplink delay is further based on at least one historical uplink delay and/or at least one historical downlink delay stored for the geographical location.

19. The method of claim 10, wherein the input data comprises one or more elements of the group of information related to video data obtained at the transportation vehicle, information related to sensor data obtained at the transportation vehicle, information related to geographical data of the transportation vehicle, information related to objects in an environment of the transportation vehicle, and information related to a downlink delay experienced at the transportation vehicle.

* * * * *